United States Patent
Sumizawa et al.

(10) Patent No.: US 7,739,037 B2
(45) Date of Patent: Jun. 15, 2010

(54) MAP UPDATE SYSTEM, NAVIGATION APPARATUS AND PROVIDING APPARATUS

(75) Inventors: Akio Sumizawa, Zama (JP); Takashi Nomura, Zama (JP); Mituteru Satou, Isehara (JP); Yuki Inoue, Zama (JP)

(73) Assignees: Xanavi Informatics Corporation, Zama-shi (JP); Nissan Motor Co., Ltd., Yokohama-shi (JP)

( * ) Notice: Subject to any disclaimer, the term of this patent is extended or adjusted under 35 U.S.C. 154(b) by 1197 days.

(21) Appl. No.: 11/281,719

(22) Filed: Nov. 18, 2005

(65) Prior Publication Data

US 2006/0122768 A1 Jun. 8, 2006

(30) Foreign Application Priority Data

Nov. 18, 2004 (JP) ............................. 2004-334411

(51) Int. Cl.
*G01C 21/32* (2006.01)
(52) U.S. Cl. ..................... 701/208; 701/210; 701/211
(58) Field of Classification Search ............... 701/201, 701/207, 208, 209, 210, 211, 213; 340/988, 340/990, 995.12, 995.18, 995.19, 995.2, 340/995.23, 995.14; 342/357.04, 357.09
See application file for complete search history.

(56) References Cited

U.S. PATENT DOCUMENTS

| 7,236,797 | B2 * | 6/2007 | Kimoto et al. ........... 455/456.1 |
| 7,383,122 | B2 * | 6/2008 | Yamada et al. ............... 701/200 |
| 7,383,127 | B2 * | 6/2008 | Matsuo et al. ............... 701/211 |
| 7,428,460 | B2 * | 9/2008 | Atarashi et al. ............. 701/208 |
| 2004/0015945 | A1 | 1/2004 | Watanabe et al. | |

FOREIGN PATENT DOCUMENTS

| JP | 2002-107169 A | 4/2002 |
| JP | 2002-149171 A | 5/2002 |
| JP | 2002-333323 A | 11/2002 |
| JP | 2003-185442 A | 7/2003 |
| JP | 2004-12319 A | 1/2004 |

* cited by examiner

*Primary Examiner*—Richard M. Camby
(74) *Attorney, Agent, or Firm*—Crowell & Moring LLP

(57) ABSTRACT

A map update system includes: a navigation apparatus that provides guidance from a current position to a destination having been set based upon map data stored therein and downloads various types of information requested by a user; and a providing apparatus that provides the various types of information to be downloaded at the navigation apparatus, and: the providing apparatus transmits the various types of information and update information related to an update of map data to the navigation apparatus in response to a download request transmitted from the navigation apparatus; and the navigation apparatus issues a notice related to the update of the map data based upon the update information transmitted from the providing apparatus, while downloading the various types of information.

18 Claims, 6 Drawing Sheets

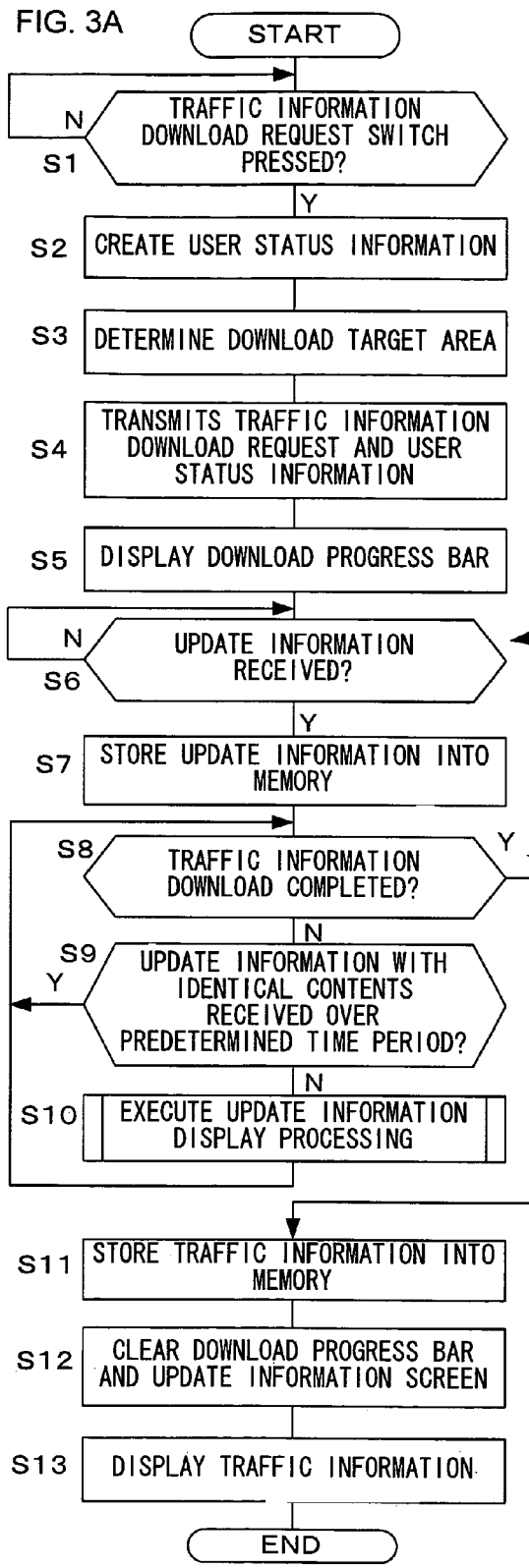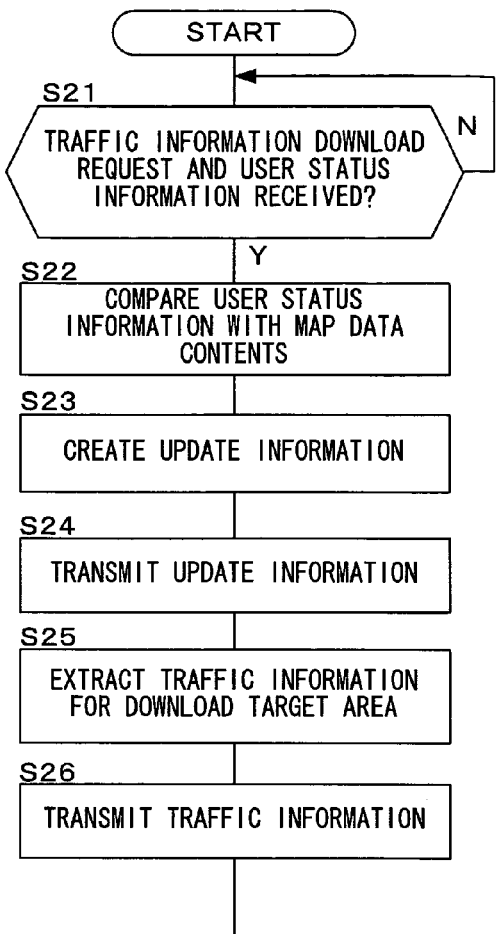
FIG. 3A
FIG. 3B
FLOWCHART FOR NAVIGATION APPARATUS
FLOWCHART FOR UPDATE MAP DATA DISTRIBUTION CENTER

MAP VERSION DISPLAY SCREEN

TEXT INFORMATION DISPLAY SCREEN

UPDATE TARGET AREA DISPLAY SCREEN

SERVICE STORE POSITION DISPLAY SCREEN

MAP UPDATE SYSTEM, NAVIGATION APPARATUS AND PROVIDING APPARATUS

INCORPORATION BY REFERENCE

The disclosure of the following priority application is herein incorporated by reference:

Japanese Patent Application No. 2004-334411 filed Nov. 18, 2004

BACKGROUND OF THE INVENTION

1. Field of the Invention

The present invention relates to a technology for updating map information stored in a navigation apparatus.

2. Description of Related Art

There is a method known in the related art that is adopted to update map data recorded in a hard disk drive (HDD) and used in an on-vehicle navigation apparatus (see Japanese Laid Open Patent Publication No. 2002-333323).

SUMMARY OF THE INVENTION

The invention disclosed in Japanese Laid Open Patent Publication No. 2002-333323 does not allow the user to ascertain whether or not the map data recorded in the HDD are the latest version map data while the navigation apparatus is operating and thus, the user is not able to determine the optimal timing with which the map data should be updated. Accordingly, there is a need for a system that enables the user to easily determine whether or not the map data should be updated while the navigation apparatus is in operation.

According to the 1st aspect of the invention, a map update system comprises: a navigation apparatus that provides guidance from a current position to a destination having been set based upon map data stored therein and downloads various types of information requested by a user; and a providing apparatus that provides the various types of information to be downloaded at the navigation apparatus, and: the providing apparatus transmits the various types of information and update information related to an update of map data to the navigation apparatus in response to a download request transmitted from the navigation apparatus; and the navigation apparatus issues a notice related to the update of the map data based upon the update information transmitted from the providing apparatus, while downloading the various types of information.

According to the 2nd aspect of the invention, in the map update system according to the 1st aspect, it is preferred that the navigation apparatus issues a notice containing information related to a pre-update map version and a post-update map version with regard to an update of map data for a specific update target area to a latest map data version, while downloading the various types of information.

According to the 3rd aspect of the invention, in the map update system according to the 1st aspect, it is preferred that the navigation apparatus issues a notice containing details of map changes to result from an update of map data for a specific update target area to a latest map data version, while downloading the various types of information.

According to the 4th aspect of the invention, in the map update system according to the 3rd aspect, it is preferred that: in response to a request from the user, the navigation apparatus transmits to the providing apparatus information related to a map version of map data currently stored therein together with the download request for the various types of information; the providing apparatus, at which text data related to details of map changes are set in advance and stored in correspondence to individual areas, extracts text data corresponding to a relevant area from the stored text data based upon the information related to the map version transmitted from the navigation apparatus and transmits the extracted text data to the navigation apparatus as the update information; and the navigation apparatus issues the notice containing the details of map changes for the user based upon the text data transmitted from the providing apparatus.

According to the 5th aspect of the invention, in the map update system according to the 1st aspect, it is preferred that the navigation apparatus indicates a position of a specific update target area while downloading the various types of information.

According to the 6th aspect of the invention, in the map update system according to the 5th aspect, it is preferred that when indicating the position of the update target area on a map, the navigation apparatus switches a map scaling factor so as to include the update target area within a range of map display.

According to the 7th aspect of the invention, in the map update system according to the 5th or the 6th aspect, it is preferred that: the providing apparatus transmits information related to a latest map version to the navigation apparatus as the update information; and the navigation apparatus selects as the update target area an area with a disparity between information related to a map version of map data currently stored therein and the information related to the latest map version transmitted from the providing apparatus.

According to the 8th aspect of the invention, in the map update system according to any of the 2nd through 7th aspects, it is preferred that the navigation apparatus also issues a notice indicating a length of communication time required to update map data in the update target area to the latest map data version, while downloading the various types of information.

According to the 9th aspect of the invention, in the map update system according to the 8th aspect, it is preferred that: the navigation apparatus is wirelessly connected with the providing apparatus via a communication terminal connected to the navigation apparatus; the providing apparatus transmits information indicating a data size of update map data to be used to update map data to the latest map data version as the update information; and the navigation apparatus determines the length of communication time based upon the data size and a communication line speed achieved at the communication terminal through wireless connection.

According to the 10th aspect of the invention, in the map update system according to the 1st aspect, it is preferred that the navigation apparatus issues a notice indicating a position of a service store offering a service for updating map data, while downloading the various types of information.

According to the 11th aspect of the invention, in the map update system according to the 10th aspect, it is preferred that when indicating the position of the service store on a map, the navigation apparatus switches a map scaling factor so as to include the service store within a range of map display.

According to the 12th aspect of the invention, in the map update system according to any of the 1st through 11th aspects, it is preferred that the navigation apparatus clears the notice once download of the various types of information is completed.

According to the 13th aspect of the invention, in the map update system according to any of the 1st through 12th aspects, it is preferred that if a notice with identical contents related to an update of map data has already been issued over a predetermined time period, the navigation apparatus does not issue the notice.

According to the 14th aspect of the invention, in the map update system according to any of the 1st through 13th aspects, it is preferred that the navigation apparatus makes a decision as to whether or not to issue the notice based upon contents of the information to be downloaded and issues the notice only if a decision to issue the notice is made.

According to the 15th aspect of the invention, in the map update system according to any of the 1st through 13th aspects, it is preferred that: the providing apparatus makes a decision as to whether or not to allow the navigation apparatus to issue the notice based upon contents of the information to be downloaded to the navigation apparatus; and the navigation apparatus issues the notice only if the providing apparatus makes a decision to allow the navigation apparatus to issue the notice According to the 16th aspect of the invention, in the map update system according to any of the 1st through 15th aspects, it is preferred that the various types of information include at least one of traffic information, current news, weather forecasts and tourist guide information.

According to the 17th aspect of the invention, in the map update system according to any of the 1st through 16th aspects, it is preferred that the navigation apparatus issues the notice related to the map data update at least either through a display or an audio output.

According to the 18th aspect of the invention, a navigation apparatus is a navigation apparatus constituting a map update system according to any of the 1st through 17th aspects.

According to the 19th aspect of the invention, a providing apparatus is a providing apparatus constituting a map update system according to any of the 1st through 17th aspects.

The navigation apparatus may be referred to as a navigation means and the providing apparatus may be referred to as a providing means instead.

BRIEF DESCRIPTION OF THE DRAWINGS

FIGS. 3A and 3B present flowcharts of the processing executed to issue a notice related to a map data update while downloading traffic information;

DESCRIPTION OF PREFERRED EMBODIMENT

Figure 1:
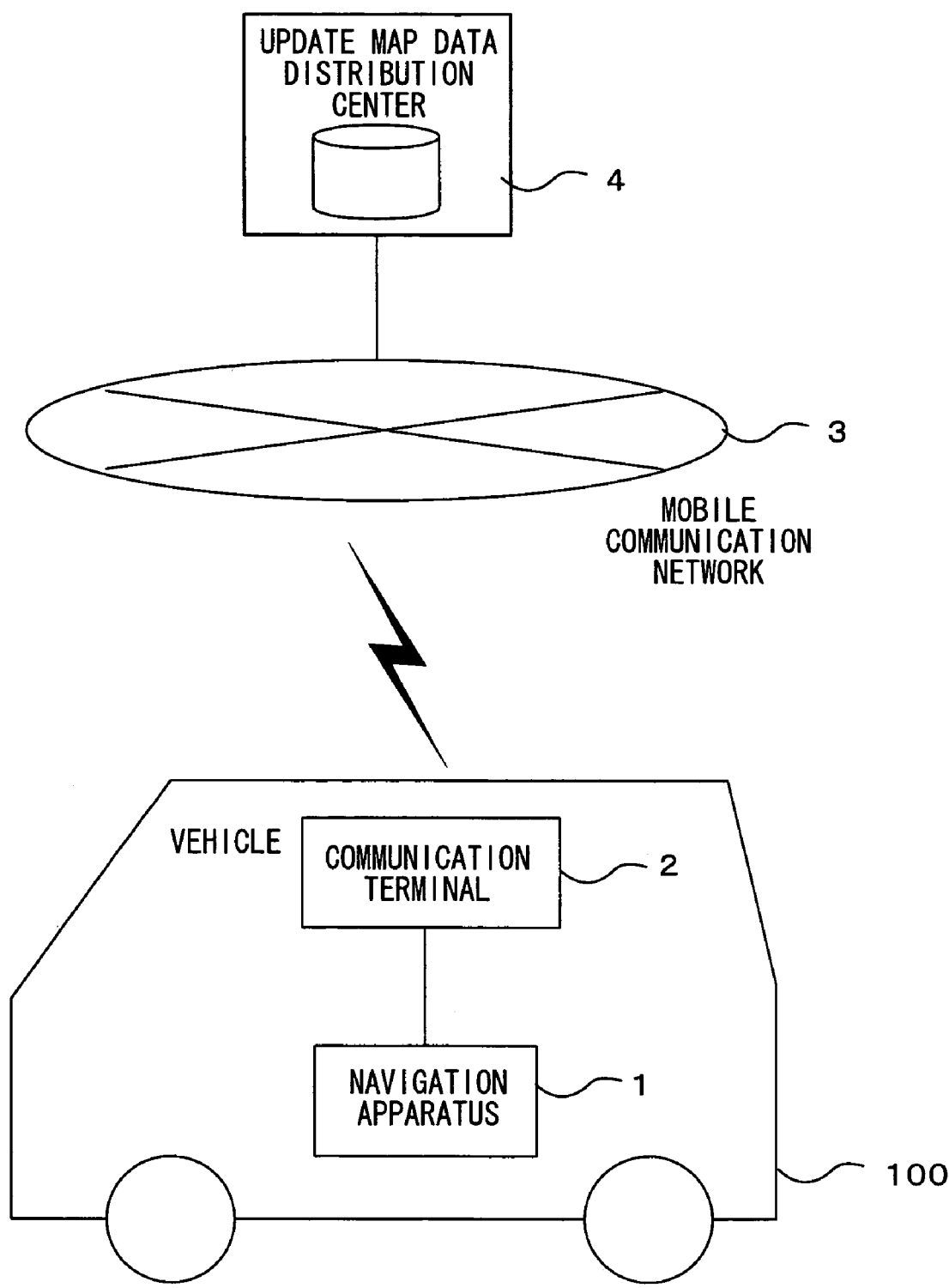
FIG. 1 shows the map update system achieved in an embodiment of the present invention.

FIG. 1 shows the map update system achieved in an embodiment of the present invention. This system comprises a navigation apparatus (on-vehicle unit) 1 installed in a vehicle 100, a communication terminal 2, a mobile communication network 3 and an update map data distribution (providing) center 4. The navigation apparatus 1 and the communication terminal 2 are connected with each other, and the mobile communication network 3 and the update map data distribution center 4 are connected with each other.

The navigation apparatus 1 guides the user from the current position to a destination set by the user, by searching for a recommended route to the destination and guiding the vehicle 100 along the recommended route based upon map data recorded in an internal HDD (hard disk drive). It is to be noted that the map data stored in the HDD of the navigation apparatus 1 can be partially updated in units of individual areas by using update map data transmitted from the update map data distribution center 4.

With the communication terminal 2, which may be a portable telephone or the like, a telephone call to a recipient with a specified telephone number can be initiated and an incoming call from another telephone can be received. When an outgoing telephone call is made or an incoming call is received at the portable terminal 2, a call line is established through a wireless connection between the portable terminal 2 and the mobile communication network 3, so as to allow the user to conduct a telephone conversation with an external telephone. It is to be noted that the navigation apparatus 1 has a hands-free talk control function and is capable of controlling the origination/reception of calls at the portable terminal 2 and recording the call history, i.e., the record of the telephone numbers of the recipients of the outgoing calls and the originators of the incoming calls.

The communication terminal 2 also has a data communication function that enables transmission of data output from the navigation apparatus 1 to the update map data distribution center 4 and output of data transmitted from the update map data distribution center 4 to the navigation apparatus 1, as well as the telephone function described above. During a data communication, a wireless connection is achieved between the communication terminal 2 and the mobile communication network 3 under control executed by the navigation apparatus 1. Through the wireless communication between the communication terminal 2 and the mobile communication network 3, a communication line between the navigation apparatus 1 and the update map data distribution center 4 is established to enable data exchange.

It is to be noted that the wireless communication between the communication terminal 2 and the mobile communication network 3 for a phone call or a data communication is enabled by a wireless base station (not shown). The wireless base station is capable of wirelessly communicating with communication terminals 2 present within a specific communication area around the wireless base station, and such wireless base stations are dispersed all over the country. In addition, the navigation apparatus 1 and the communication terminal 2 may be connected with each other through a wireless connection such as an infrared connection, or a wired connection achieved by using a cable or the like.

When updating the map data stored in the HDD at the navigation apparatus 1, an update map data delivery request is first transmitted from the navigation apparatus 1 to the update map data distribution center 4 through the data communication function of the communication terminal 2 described above. Namely, under the control executed by the navigation apparatus 1, the communication terminal 2 and the mobile communication network 3 are wirelessly connected with each other and the communication line between the navigation apparatus 1 and the update map data distribution center 4 is established. In this state, the update map data delivery request is output from the navigation apparatus 1 to the communication terminal 2 from which the request is transmitted to the update map data distribution center 4. Thus, the update map data distribution center 4 receives the request for update map data delivery.

At the update map data distribution center 4, a map server having the latest version of map data stored therein is installed. As the update map data delivery request from the navigation apparatus 1 is transmitted as described above, the update map data distribution center 4 creates update map data based upon the latest version of the map data stored in the map server. At this time, the update map data are created only for an update target area specified by the user among the update unit areas each set in advance in correspondence to a specific area. An update unit area means an area corresponding to a unit for update. The update map data thus created are then transmitted from the update map data distribution center 4 to the navigation apparatus 1.

Upon receiving the update map data from the update map data distribution center 4, the navigation apparatus 1 updates part of the map data stored in the HDD, i.e., the map data over the update target area, by using the update map data. The map data thus become updated.

In addition, the navigation apparatus 1 is capable of downloading traffic information indicating road congestion conditions, current traffic control conditions and the like from the update map data distribution center 4. At the update map data distribution center 4, the latest traffic information is continually collected and stored. In response to a traffic information download request issued from the navigation apparatus 1, the update map data distribution center 4 transmits the traffic information for a specific area corresponding to the request. Based upon the traffic information downloaded at the navigation apparatus 1, the road congestion conditions and the current traffic control conditions are indicated on the map for the user's benefit.

It is to be noted that while the length of time required to download such traffic information at the navigation apparatus 1 as described above varies depending upon the volume of the data constituting the traffic information and the line speed of the communication terminal 2, the download can normally be completed in a minute or so. In the map update system achieved in the embodiment, a notice related to a map data update is issued to the user by taking advantage of the period of time during which the traffic information is downloaded. More specifically, by executing the processing in the flowchart in FIGS. 3A and 3B, which is to be explained later, at the navigation apparatus 1 and the update map data distribution center 4, various screen displays are brought up at the navigation apparatus 1 based upon update information transmitted from the update map data distribution center 4, while the traffic information download is underway. This enables the user to judge whether or not the map data needed to be updated and if a map data update is necessary, the user is able to update the map data by transmitting an update map data delivery request to the update map data distribution center 4.

Figure 2:
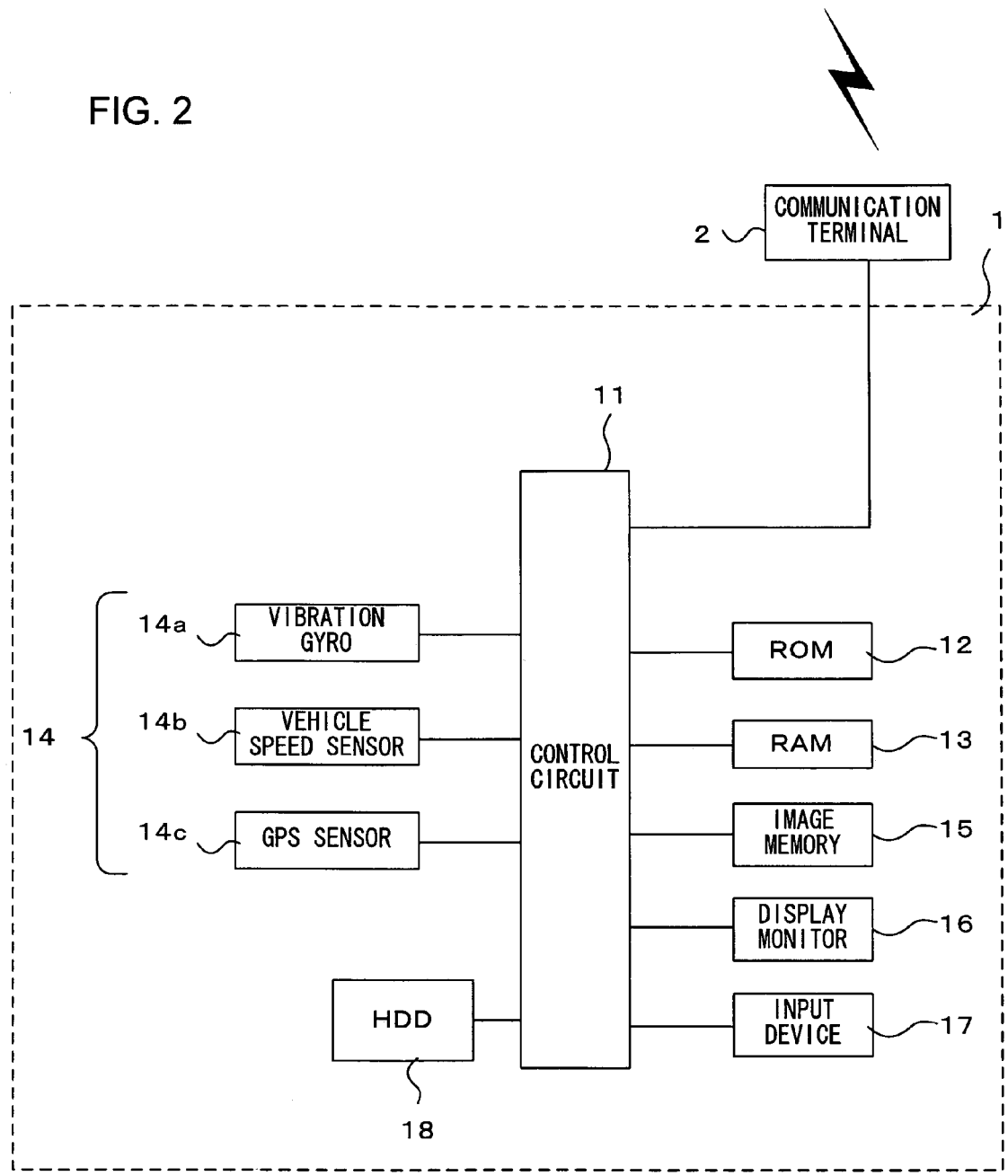
FIG. 2 shows the structure of the navigation apparatus.

FIG. 2 shows the structure of the navigation apparatus 1. The navigation apparatus 1 comprises a control circuit 11, a ROM 12, a RAM 13, a current position detection device 14, an image memory 15, a display monitor 16, an input device 17 and an HDD 18. The communication terminal 2 is connected to the control circuit 11.

The control circuit 11, which is constituted with a microprocessor and its peripheral circuits, executes various types of processing and control by executing with a work area constituted of the RAM 13 a control program stored in the ROM 12. As the processing in the flowchart shown in FIG. 3A is executed in the control circuit 11, a traffic information download request is transmitted to the update map data distribution center 4, the traffic information delivered from the update map data distribution center 4 in response is received and the received traffic information is displayed at the display monitor 16. It is to be noted that the flowcharts in FIGS. 3A and 3B are to be described in detail later.

The current position detection device 14, which detects the current position of the subject vehicle, may comprise a vibration gyro 14*a* that detects the advancing azimuth of the subject vehicle, a vehicle speed sensor 14*b* that detects the vehicle speed, a GPS sensor 14*c* that detects a GPS signal from a GPS satellite and the like. Based upon the current position of the subject vehicle detected by the current position detection device 14, the navigation apparatus 1 is able to determine a route search start point for a recommended route search.

In the image memory 15, image data to be displayed at the display monitor 16 are temporarily stored. The image data, which are constituted with road map drawing data used to display a map image, various types of graphic data and the like, are generated by the control circuit 11 based upon the map data recorded in the HDD 18. The image data stored in the image memory 15 are used to display a map of an area around the subject vehicle position, the road congestion conditions, the current traffic control conditions and the like at the display monitor 16.

The input device 17, which includes various types of input switches operated by the user to set a destination, issue a traffic information delivery request and the like, may be realized as an operation panel or a remote control device. The user operates the input device 17 as prompted by screen instructions brought up on display at the display monitor 16 to set a destination by specifying a geographical name or a position on a map and thus engages the navigation apparatus 1 in a route search for a route to the destination. In addition, a traffic information download request and a map data update request are issued through operations of the input device 17.

The map data are recorded in the HDD 18 as explained earlier. In other words, the navigation apparatus 1 stores the map data in the HDD 18. It is to be noted that while an explanation is given on an example in which the map data are recorded in an HDD, another type of rewritable nonvolatile recording device, e.g., a rewritable recording device such as a DVD RAM, a flash memory or the like, may be used instead of an HDD.

The map data recorded in the HDD 18 include route calculation data used to determine through arithmetic operation a recommended route, route guidance data indicating intersection names, road names and the like and used to guide the subject vehicle to the destination along the recommended route, road data indicating road shapes and background data indicating the shapes of items on the map other than roads, including shorelines, rivers, railway tracks and buildings. In addition, the map data include POI data indicating POI names, POI positions, POI types, POI telephone numbers and the like. It is to be noted that except for the route calculation data, the map data are provided as separate files, each corresponding to a specific update unit area and thus, the map data can be rewritten in units of individual files. As a result, the map data can be partially updated in units of individual areas.

The smallest unit representing a road portion in the road data is referred to as a link. Namely, each road is constituted with a plurality of links each set in correspondence to a specific road portion. It is to be noted that the lengths of the road portions defined by the individual links are not uniform and that the lengths of links vary. Links are connected with one another at points referred to as nodes and each node holds position information (coordinate information). In addition, a point referred to as a shape interpolation point may be set within a link between nodes. As do the nodes, shape interpolation points, too, each hold position information (coordinate information). Based upon the position information at the nodes and the shape interpolation points, the shapes of individual links constituting a road and, ultimately, the shape of the road itself, are determined. The route calculation data include values referred to as link costs, which indicate the lengths of time required by the subject vehicle to travel through the links, each set in correspondence to one of the links.

As a destination is set through a user operation of the input device 17 as explained above, a route calculation is executed in conformance to a specific algorithm based upon the route calculation data to determine a route to the destination having been set from a current position detected by the current position detection device 14 and designated as the route search start point. Then, a map of an area around the recommended route thus determined is brought up on display at the display monitor 16, and instructions for right/left turns and the like are provided as necessary along the recommended route.

The processing in the flowcharts presented in FIGS. 3A and 3B is executed at the navigation apparatus 1 and the update map data distribution center 4. Through the processing, traffic information delivered from the update map data distribution center 4 is downloaded and displayed at the navigation apparatus 1 and also, a notice related to a map data update is issued while the traffic information download is underway. The processing is now explained in reference to the flowcharts presented in FIGS. 3A and 3B. It is to be noted that the flowchart of the processing executed at the navigation apparatus 1 is presented in FIG. 3A and that the flowchart of the processing executed at the update map data distribution center 4 is presented in FIG. 3B.

In step S1 in FIG. 3A, the navigation apparatus 1 makes a decision as to whether or not a traffic information download request switch has been pressed. The traffic information download request switch, which is operated to issue a traffic information download request to the update map data distribution center 4 from the navigation apparatus 1, is included in the input device 17. If the traffic information download request switch has been pressed, the operation proceeds to the following step S2 to initiate a traffic information download. It is to be noted that while the traffic information download is initiated in response to an operation of the traffic information download request switch in this example, the download may be initiated through another method. For instance, the traffic information download may be initiated when an operation has been performed at the input device 17 through a predetermined operational sequence or when a predetermined condition such as the passage of a predetermined length of time has been satisfied.

In step S2, user status information is created. The user status information is used to inform the update map data distribution center 4 of the current status of the navigation apparatus 1. More specifically, the user status information generated in step S2 indicates the current position, the position of the destination and the map version of the map data currently stored in the HDD 18. It is to be noted that since the map data are rewritten in units of individual files each corresponding to a single update unit area, as explained earlier, specific map data versions are indicated in correspondence to the individual map data unit areas in the map data. Accordingly, the user status information contains information indicating the current map versions corresponding to all the update unit areas.

The term "map versions" refers to information related to map versions, which indicates map revisions and updated editions. This information may be constituted with, for instance, revision dates, alphanumeric characters and the like.

In step S3, a download target area for the traffic information download is determined. In this example, an area within a specific range along the route from the current position to the destination is set as the download target area. In step S4, a traffic information download request indicating that a traffic information download has been requested is transmitted to the update map data distribution center 4 together with the user status information having been created in step S2. It is to be noted that the traffic information download request transmitted in this step contains information used to specify the download target area having been determined in step S3.

Upon receiving in step S21 in FIG. 3B the traffic information download request and the user status information transmitted from the navigation apparatus 1 in step S4 in FIG. 3A, the operation at the update map data distribution center 4 proceeds to the following step S22. In step S22, the user status information received in step S21 is compared with the latest map data stored in the map server to determine the difference between them. Based upon the details of the difference thus determined, update information related to a map data update is prepared in the following step S23. The update information prepared in step S23 is used when a notice related to the map data is issued at the navigation apparatus 1, and based upon the contents of the update information, the contents of the notice issued at the navigation apparatus 1 are determined as detailed later. In step S24, the update information prepared in step S23 is transmitted to the navigation apparatus 1.

The contents of the update information described above are now explained. The update information contains information indicating the map version and the data size of the latest map data, as well as text data indicating the details of changes to result from an update of the map data at the navigation apparatus 1 to the latest map data. It is to be noted that since the map data are rewritten in units of individual files each corresponding to a single update unit area as explained earlier, the update information contains information indicating the latest map versions and the data sizes of the latest map data for all the update unit areas. Namely, the update information contains the latest map version and the data size set in correspondence to each update unit area, indicating the map version and the data size of a specific set of update map data.

The contents of the text data are determined based upon the current map version indicated in the user status information having been transmitted from the navigation apparatus 1. More specifically, the current map version and the latest map version are compared with each other for each update unit area in step S22 to identify update unit areas with map version disparities. The contents of the text data are determined based upon the current map version in each of the update unit areas thus identified. It is to be noted that at the update map data distribution center 4, text data prepared in advance in correspondence to the content disparities between the specific map versions and the corresponding latest map version are recorded for all the update unit areas. Thus, once the current map version in a given update unit area is ascertained as described above, one set of text data among sets of text data with varying contents set in advance in correspondence to the update unit area can be extracted to determine the contents of the text data in the update information.

It is to be noted that the text data may be extracted as described above only for a specific update unit area alone instead of extracting text data for all the update unit areas in which the current map versions do not match the latest map versions. For instance, when bringing up a text display indicating the details of changes to result from an update of the map data in an area around the user's home designated as an update target area to the latest version of the map data as explained later, user status information indicating the position of the user's home may be received from the navigation apparatus 1 used to determine the user's home position at the update map data distribution center 4 and extract the text data only in correspondence to the update unit area closest to the home position. By allowing text data to be extracted in correspondence to a specific update unit area alone, the data volume of the update information to be transmitted can be reduced, which, in turn, achieves reductions in the length of communication time and communication cost.

In response to the download request from the navigation apparatus 1, the information carrying the contents described above is transmitted as the update information from the update map data distribution center 4 to the navigation apparatus 1 in step S24. In step S25, the traffic information download target area is judged based upon the traffic information download request having been received in step S21. Then, the traffic information within the download target area is extracted from the latest traffic information being stored. In step S26, the traffic information corresponding to the download target area, which has been extracted in step S25, is transmitted to the navigation apparatus 1. Once the processing in step S26 is executed, the update map data distribution center 4 ends the processing in FIG. 3B.

After transmitting the traffic information download request and the user status information to the update map data distribution center 4 in step S4 as described above, the navigation apparatus 1 brings up a display of a download progress bar in the next step S5. The download progress bar, which is a bar graph indicating that a traffic information download is in progress and the progress status of the download, becomes filled as the download progresses. It is to be noted that display examples of the download progress bar are presented in FIGS. 5 through 8, which are to be described later.

In step S6, a decision is made as to whether or not the update information transmitted in step S24 in FIG. 3B from the update map data distribution center 4 has been received. If it is decided that the update information has been received, the operation proceeds to the following step S7 to store the received update information into the memory (RAM 13). In the next step S8, a decision is made as to whether or not the download of the traffic information transmitted in step S26 in FIG. 3B from the update map data distribution center 4 has been completed. If the traffic information download has not been completed yet, the operation proceeds to step S9, whereas if the download has been completed, the operation proceeds to step S11. The processing executed when the operation proceeds to step S9 is now explained.

In step S9, a decision is made as to whether or not update information with contents identical to those of the update information having been stored into the memory in step S7 had already been received during a predetermined period of time, e.g., within the past month. If update information with identical contents has been received, the operation returns to step S8. In this case, no further processing is executed until the traffic information download is completed and once the download is completed, the operation proceeds to step S11. If the contents of the two sets of update information are identical, the contents of the notices related to the map data update, too, will be identical and, accordingly, the processing follows the flow described above to ensure that if the user had already been provided with an identical notice related to the map data update over the predetermined period of time, another notice with exactly the same contents is not issued.

If, on the other hand, update information with identical contents is not received over the predetermined period of time, the operation proceeds to step S10 to execute update information display processing for providing a notice related to the map data update based upon the update information. As this processing is executed, an update information screen such as any of those shown in FIGS. 5 through 8 to be detailed later are brought up on display at the display monitor 16 in correspondence to the contents of the update information stored in the memory. It is to be noted that the specific details of the update information display processing are to be described later in reference to the flowchart presented in FIG. 4. Once the processing in step S10 is executed, the operation returns to step S8. Through this processing flow, an update information screen is displayed until the traffic information download is completed.

Next, the processing executed when the operation proceeds from step S8 to step S11 is explained. In step S11, the traffic information having been downloaded is stored into the memory. In step S12, the download progress bar having been brought up on display in step S5 and the update information screen having been brought up on display through the update information display processing in step S10 are cleared from the display monitor 16. With the download progress bar and the update information screen cleared, the notice related to the map data update is no longer provided once the traffic information download is completed. Subsequently, the contents of the traffic information having been stored into the memory in step S11 are displayed on the screen at the display monitor 16 in step S13. As a result, the road congestion conditions and the current traffic control conditions are displayed on the map for the user's benefit. Once the processing in step S13 is executed, the navigation apparatus 1 ends the processing in the flowchart in FIG. 3A. Through the processing described above, the traffic information is downloaded and displayed at the navigation apparatus 1 and also, the notice related to the map data update is provided based upon the update information transmitted from the update map data distribution center 4 while the traffic information download is in progress.

Figure 4:
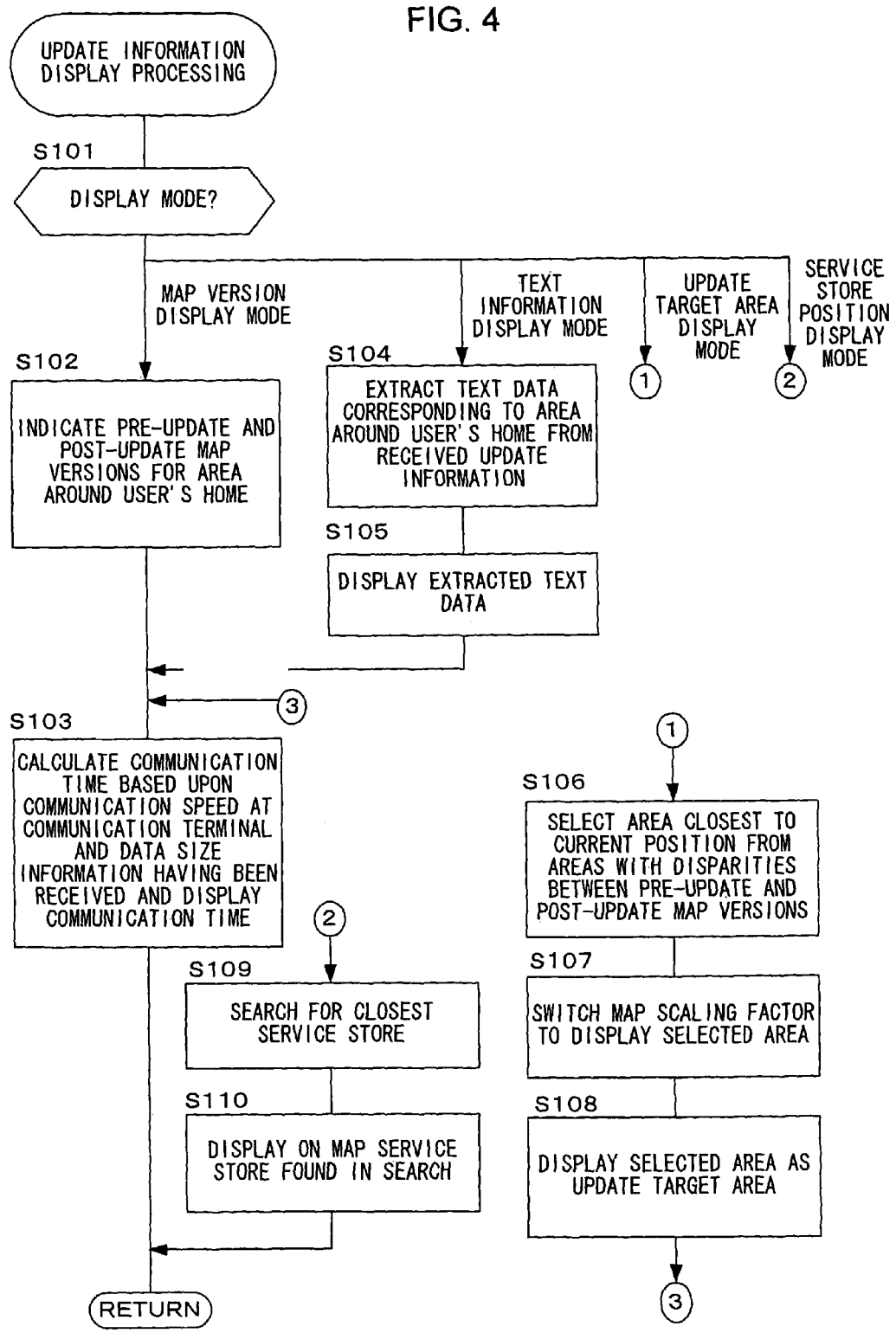
FIG. 4 presents a flowchart of the update information display processing.

The following is an explanation of the update information display processing given in reference to the flowchart presented in FIG. 4. As the processing in the flowchart shown in FIG. 4 is executed in step S10 in FIG. 3A, update information with various contents can be displayed. In step S101, a decision is made as to which display mode among (a) a map version display mode, (b) a text information display mode, (c) an update target area display mode and (d) a service store position display models currently selected. Based upon the results of the decision made with regard to the current display mode setting, the operation proceeds to step S102, step S104, step S106 or step S108. It is to be noted that the user is able to set in advance one of the four display modes listed above. Alternatively, the user may be prompted to perform a specific operation to select a display mode before the processing in step S101 is executed.

(a) Map Version Display Mode

If the current display mode setting is the map version display mode, the operation proceeds from step S101 to step S102. In the map version display mode, pre-update and post-update versions of the map data in an area around the user's home among various update unit areas designated as an update target area are indicated to the user in the display. If the pre-update map version and the post-update map version are different from each other, the user is prompted to update the map data. In step S102, the pre-update map version and the post-update map version, i.e., the current map version and the latest map version, for the area around the user's home are individually indicated at the display monitor 16.

It is to be noted that the pre-update and the post-update map versions are indicated in step S102 based upon the latest map version transmitted from the update map data distribution center 4. More specifically, the current map version can be determined by referencing the map data recorded in the HDD 18 to check the map version of the data corresponding to the area surrounding the user's home. The latest map version can be ascertained by extracting the latest map version for the area surrounding the user's home among the latest map versions corresponding to all the update unit areas contained in the update information having been transmitted from the update map data distribution center 4 in step S24 in FIG. 3B and having been stored into the memory in step S7.

In step S103, based upon the communication line speed at the communication terminal 2 and the size of the latest map data indicated in the update information having been stored into the memory in step S7, the length of communication time required to update the map data in the area around the user's home designated as the update target area to the latest map data is calculated and the length of communication time thus determined is displayed at the display monitor 16 to advise the user. It is to be noted that information indicating the communication line speed at the communication terminal 2 is output from the communication terminal 2 to the navigation apparatus 1. Once the pre-update and post-update map versions and the length of communication time are brought up on display, the processing in the flowchart in FIG. 4 ends and the processing in step S10 in FIG. 3A is completed.

Figure 5:
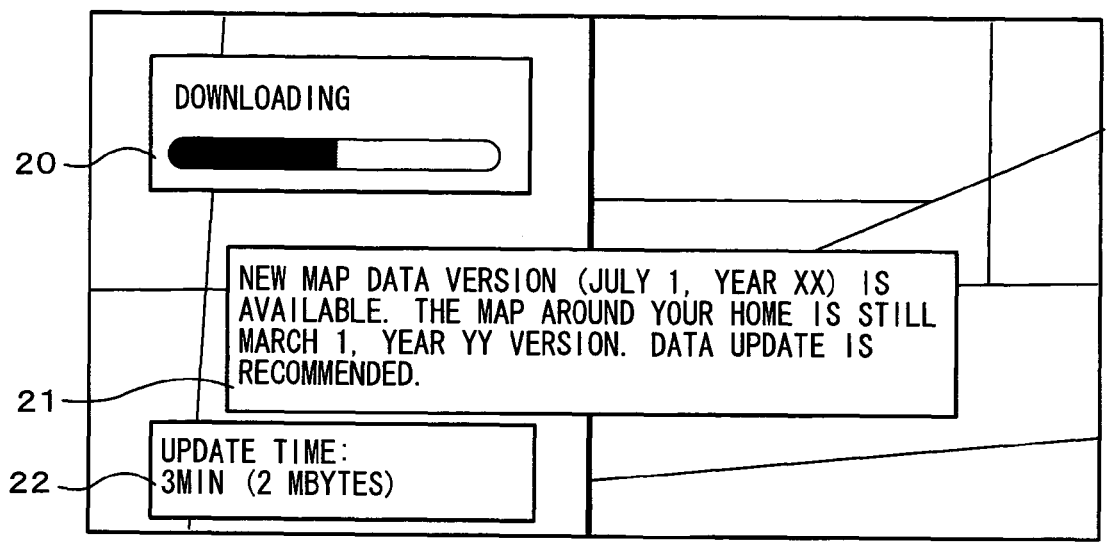
FIG. 5 presents an example of a map version display screen.

FIG. 5 presents an example of the map version display screen brought up on display in the map version display mode explained above. In a display field 21, the pre-update and post-update map versions for the area around the user's home are both indicated and the user is prompted to update the map data. In a display field 22, the length of communication time required to update the map data to the latest version, i.e., approximately three minutes of communication time to elapse before the update map data, is indicated together with the data size, 2 M bytes. It is to be noted that in a display field 20, the download progress bar brought up in step S5 in FIG. 3A is displayed. This download progress bar is gradually filled from the left to the right to indicate the download progress status as explained earlier.

It is to be noted that an area other than the area around the user's home, such as an area around the current position, may be designated as the target area in the map version display mode. In addition, if the current map version and the latest map version corresponding to the target area are the same, it is desirable to indicate that no update is required instead of indicating the pre-update and post-update map versions and the length of communication time as described above. Alternatively, an area where the current map version and the latest map version do not match may be selected from areas other than the area around the user's home, such as the area around the current position and areas adjacent to the area immediately around the user's home, and the pre-update and post-update map versions and the length of communication time may be indicated for the selected area.

(b) Text Information Display Mode

If the current display mode is the text information display mode, the operation proceeds from step S101 to step S104. In the text information display mode, the contents of map changes to result from the update of the map data to the latest map data version in the area around the user's home designated as the update target area are indicated to the user in a text display. In step S104, the text data corresponding to the area around the user's home are extracted from the update information having been stored into the memory in step S7 in FIG. 3A. As described earlier, the text data indicate the contents of changes to result from the update of the map data in the navigation apparatus 1 to the latest map data version.

In step S105, the text data having been extracted in step S104 are displayed at the display monitor 16. Through this processing, the contents of the map changes to result from the update of the map data in the area around the user's home to the latest map data version are indicated to the user in a text display based upon the text data transmitted from the update map data distribution center 4. Once the processing in step S105 is executed, the processing in step S103 is executed as described earlier to indicate the length of communication time, and then the processing in the flowchart in FIG. 4 ends, thereby completing the processing in step S10 in FIG. 3A.

Figure 6:
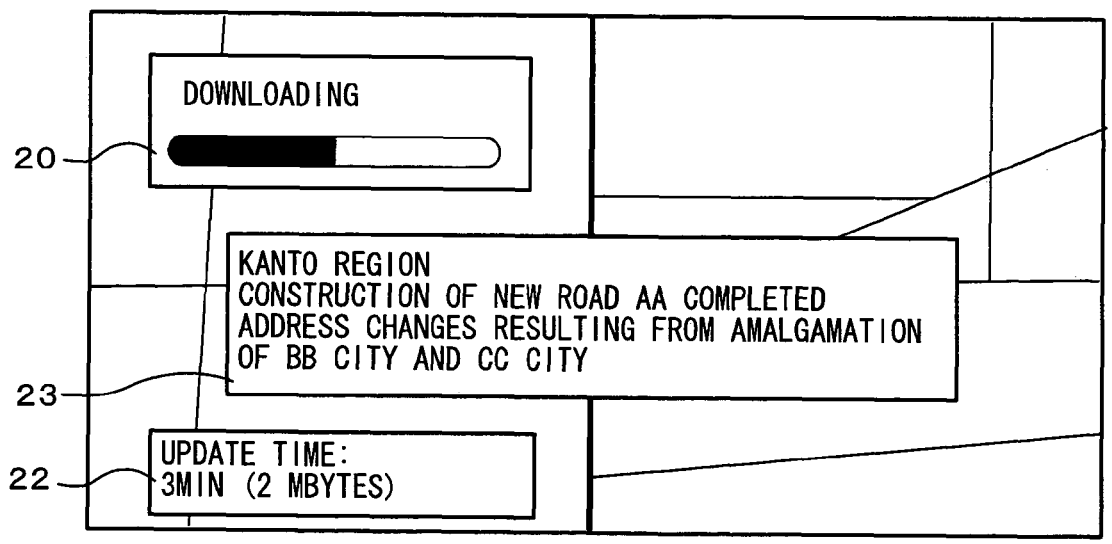
FIG. 6 presents an example of a text information display screen.

FIG. 6 presents an example of the text information display screen brought up on display in the text information display mode explained above. The text display of the contents of map changes to result from the update to the latest map data version for the area around the user's home, which is in the Kanto region in this example, is brought up in a display field 23. It is to be noted that in the text information display mode, too, an area other than the area around the user's home such as an area around the current position may be designated as the target area as in the map version display mode.

(c) Update Target Area Display Mode

If the display mode setting is the update target area display mode, the operation proceeds from step S101 to step S106. In the update target area display mode, the user is advised of the position of the update target area near the current position, which is indicated on the map. In step S106, areas with map version disparities between the pre-update and post-update versions are determined based upon the update information having been transmitted in step S24 in FIG. 3B from the update map data distribution center 4 and stored into memory in step S7. Then, the area closest to the current position among those areas is selected as the update target area. Namely, among the areas with map version disparities between the map versions of the corresponding map data currently stored in the HDD 18 and the latest map versions indicated in the update information having been transmitted from the update map data distribution center 4 and having been stored into the memory, the area closest to the current position is designated as the update target area.

In step S107, the map scaling factor is switched so as to display the update target area selected in step S106. Namely, if the update target area is not contained within the range of the map currently on display, the map scaling factor is switched to a wider area setting so as to include the update target area in the range of the map on display. In step S108, the area having been selected in step S106 is indicated as the update target area in a distinguishable manner on the map, the scaling factor of which has been switched in step S107. Once the update target area is indicated on the map, the processing in step S103 described above is executed to indicate the length of communication time. Then the processing in the flowchart in FIG. 4 ends, completing the processing in step S10 in FIG. 3A.

Figure 7:
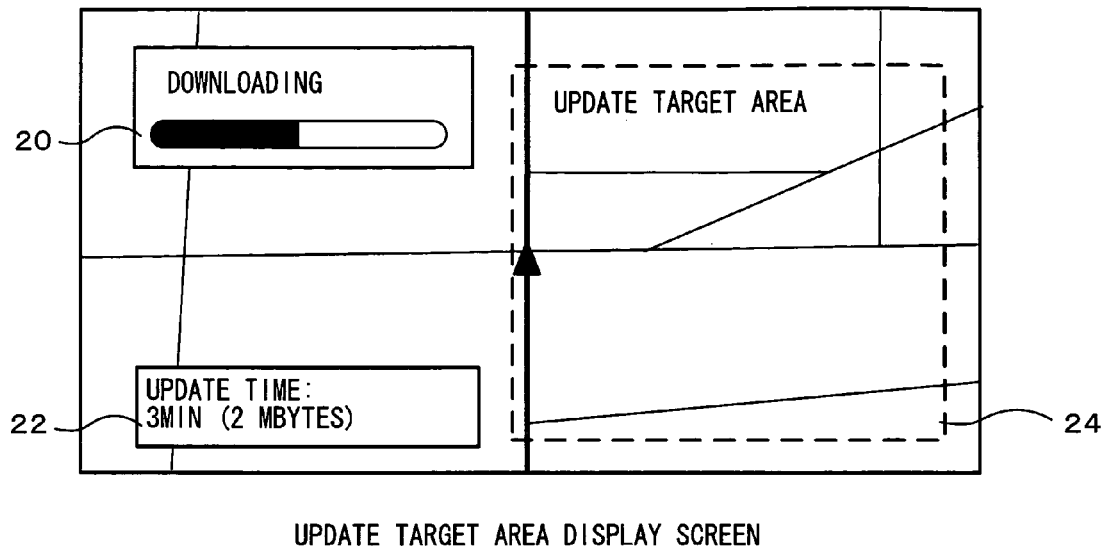
FIG. 7 presents an example of an update target area display screen.

FIG. 7 presents an example of the update target area display screen brought up on display in the update target area display mode described above. A display frame 24 indicates that the update target area is present within this frame. It is to be noted that the update target area may be indicated in a mode other than such a display frame. For instance, the update target area may be distinguished from the other areas by using a different display color or a different display pattern. Alternatively, the update target area may be made to flash for easy identification. In addition, an area other than the area closest to the current position, such as an area around the user's home, may be indicated as the update target area.

(d) Service Store Position Display Mode

If the display mode setting is the service store position display mode, the operation proceeds from step S101 to step S109. In the service store position display mode, the position of a service store in the vicinity of the current position is indicated on the map. It is to be noted that the term "service store" is used to refer to a store where map data update services are offered, such as an car dealer outlet. For instance, if the map data for the entire nation are to be updated all at once, the volume of the update map data will be very large and it will be extremely time-consuming to receive the update map data from the update map data distribution center 4. In such a case, it is more convenient to update the map data at a service store.

In step S109, the service store closest to the current position is searched based upon the map data in the HDD 18. In step S110, the position of the service store found in the search executed in step S109 is indicated on the map. It is to be noted that the map scaling factor should be switched as necessary so as to ensure that the service store position is contained within the map. Once the position of the service store is indicated on the map, the processing in the flowchart shown in FIG. 4 ends, and the processing in step S10 in FIG. 3A is completed.

Figure 8:
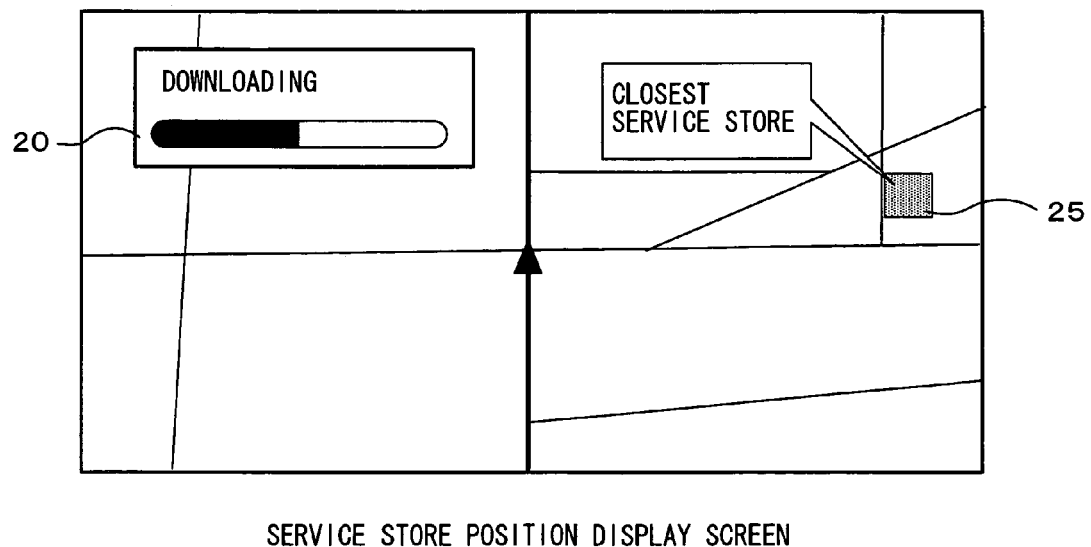
FIG. 8 presents an example of a service store position display screen.

FIG. 8 presents an example of the service store position display screen brought up on display in the service store position display mode described above. The mark assigned with reference numeral 25 indicates that the closest service store from the current position is located at this position. It is to be noted that if the user wishes to update the map data at a service store, a route search should be executed by designating the closest service store as the destination in response to an input operation performed in the service store position display screen.

The following advantages are achieved in the embodiment described above.

(1) A notice related to a map data update is issued at the navigation apparatus 1 by executing the update information display processing (step S10) based upon update information having been transmitted from the update map data distribution center 4, while traffic information requested by the user is being downloaded. As a result, the user is able to easily judge whether or not map data need to be updated while the navigation apparatus is in operation.

(2) When the display mode setting is the map version display mode, the pre-update and post-update map versions, i.e., the current map data version and the latest map data version, are indicated (step S102) for the update target area such as an area around the user's home, while downloading traffic information. Thus, the user is informed of any disparity between the pre-update map version and the post-update map versions, which enables the user to make a correct decision as to whether or not the map data need to be updated.

(3) When the display mode setting is the text information display mode, the contents of map changes to result from the update of the map data to the latest map data version are indicated in a text display (step S104) for the user with regard to the update target area such as an area around the user's home, while traffic information is being downloaded. As a result, the user, informed of the specific details of map changes to result from the map data update, is able to make a correct decision as to whether or not the map data need to be updated.

(4) In the text information display mode, the navigation apparatus 1 transmits (step S4) user status information indicating the map versions of the map data currently stored therein together with a traffic information download request to the update map data distribution center 4, in response to a traffic information download request issued by the user (step S1). The update map data distribution center 4 generates update information (step S23) by extracting a specific set of text data among sets of text data with varying contents set in advance in correspondence to each area based upon the map versions of the current map data indicated in the status information having been transmitted from the navigation apparatus 1, and transmits the extracted text data to the navigation apparatus 1 as the update information (step S24). The user is then informed of the details of the map changes through a text display brought up at the navigation apparatus 1 based upon the text data. Thus, the correct contents indicating the map changes can be provided to the user through simple processing.

(5) When the display mode setting is the update target area display mode, the position of the update target area such as an area around the user's home is indicated on the map (step S108) for the user's benefit while downloading traffic information. The user, informed of the position of the target area for the map data update, is able to make a correct decision as to whether or not the map data need to be updated.

(6) In the update target area display mode, the navigation apparatus 1 switches the map scaling factor (step S107) so as to ensure that the update target area is included within the range of the map display. As a result, the position of the update target area can be indicated on the map with a high degree of reliability.

(7) In the update target area display mode, the update map data distribution center 4 transmits update information indicating the latest map versions to the navigation apparatus 1 (step S24). At the navigation apparatus 1, one area such As an area around the user's home is selected as the update target area (step S106) from areas with disparities between the map versions of the map data currently stored in the navigation apparatus and the latest map versions indicated in the update information having been transmitted from the update map data distribution center 4. As a result, the optimal update target area can be selected through simple processing.

(8) In the map version display mode, the text information display mode and the update target area display mode, the length of communication time required for the update of the map data in the update target area to the latest map data version is also indicated (step S103) for the user's benefit while downloading the traffic information. This allows the user to take into consideration the length of communication time required for the update when making a decision as to whether or not to update the map data.

(9) The update map data distribution center 4 transmits update information indicating the data size of the update map data to the navigation apparatus 1 (step S24) to be used in the calculation of the length of communication time. At the navigation apparatus 1, the length of communication time is determined based upon the data size and the communication line speed achieved at the communication terminal 2 through wireless connection. As a result, an accurate length of communication time can be determined based upon the specific communication terminal type and the specific data size.

(10) When the display mode setting is the service store position display mode, the position of a service store is indicated on the map (step S110) for the user's benefit while downloading traffic information. By this means, this display mode is particularly effective when the data volume of the update map data is very large and receiving the update map data from the update map data distribution center 4 is bound to be an extremely time-consuming process, since the user, advised of the position of the service store offering the map data update service, is able to make the correct decision as to whether or not to update the map data.

(11) In the service store position display mode, the navigation apparatus 1 switches the map scaling factor to ensure that the service store is included within the range of the map display. As a result, the position of the service store can be indicated on the map with a high degree of reliability.

(12) Once the traffic information download is completed, the update information screen is cleared at the navigation apparatus 1 and the notice is no longer provided (step S12) This allows the traffic information to be brought up on display promptly once the download is completed.

(13) If a notice with identical contents with regard to the map data update has already been issued at the navigation apparatus 1 over a predetermined time period, the notice is not reissued (step S9). As a result, a notice with the same contents is not issued repeatedly every time traffic information is downloaded.

It is to be noted that while an explanation is given above in reference to the embodiment strictly on an example in which a notice related to a map data update is issued while downloading traffic information, a similar notice may be issued while downloading information other than traffic information. For instance, a notice related to a map data update can be issued as described above while downloading downloadable information provided by the update map data distribution center 4, such as current news, weather forecasts and tourist guide information, at the navigation apparatus 1.

In addition, if map data update notices are to be issued while downloading various types of information as described above, a decision may be made as to whether or not a notice is to be issued based upon the contents of the information being downloaded and a map data update notice may be issued only if it is decided that a notice is to be issued. For instance, when downloading information with a relatively small data volume such as current news or a weather forecast, which can be downloaded quickly, it may be decided that the map data update notice is not to be issued, whereas it may be decided that a notice is to be issued when downloading information such as tourist guide information with a relatively large data volume, which needs a considerable length of time to download. In this case, information that does not take very long to download can be downloaded quickly and a map data update notice is issued while downloading information requiring a considerable length of time to download so as to allow the user to decide whether or not to update the map.

It is to be noted that the decision as to whether or not a map data update notice is to be issued may be made at the navigation apparatus 1 or at the update map data distribution center 4. The decision may be made at the navigation apparatus 1 based upon, for instance, the specific type of information requested by the user, by transmitting flag information allowing/disallowing transmission of the update information to the update map data distribution center 4. In conformance to this flag information, the transmission of the update information from the update map data distribution center 4 is controlled.

The decision may be made at the update map data distribution center 4 instead by, for instance, determining the contents of the information to be downloaded in correspondence to the download request from the navigation apparatus 1, judging whether or not a notice should be issued at the navigation apparatus 1 based upon the contents and transmitting the update information to the navigation apparatus 1 only if it is decided that a notice is to be issued. Based upon the update information, the navigation apparatus 1 executes the update information display processing described earlier. Through this process, the navigation apparatus 1 is enabled to issue a map data update notice only if it is decided at the update map data distribution center 4 that a notice is to be issued.

In addition, while an explanation is given above in reference to the embodiment on an example in which a notice related to a map data update is issued, a notice related to a rewrite of software (firmware) in the navigation apparatus 1 may be issued while downloading any of various types of information such as traffic information.

While an explanation is given above in reference to the embodiment on an example in which the map data update notice is provided through a screen display brought up at the display monitor 16, the notice may be provided in other forms such as an audio message output through a speaker. Furthermore, the notice may be provided in a combination of a screen display and another method.

While the navigation apparatus 1 is installed in the vehicle 100 in the embodiment described above, the present invention is not limited to this example and it may be adopted in a portable navigation apparatus that can be carried around. It may also be adopted in a portable telephone with a navigation function. In other words, the present invention may be adopted in all types of apparatuses with navigation functions, capable of providing guidance from the current position to a destination having been set based upon map data.

A control program for the navigation apparatus 1 described above may be installed in a personal computer to enable it to function as a navigation apparatus. In such a case, the control program that enables the personal computer to operate as the navigation apparatus may be provided in a recording medium such as a DVD or a CD-ROM, or through a data signal on the Internet or the like. The control program that will realize the navigation apparatus having the features explained earlier may be thus distributed as a computer-readable computer program product adopting any of various modes including a recording medium and a carrier wave. In addition, the program executed at the update map data distribution center 4, too, can be distributed as a computer-readable computer program product adopting any of various modes including a recording medium and a carrier wave.

In the embodiment described above, the map is stored in the HDD 18 and various types of processing are executed at the control circuit 11 in the navigation apparatus 1 or at the update map data distribution center 4. However, this simply represents an example and components other than those described in reference to the embodiment may be used to achieve the present invention, as long as the features of the present invention remain intact.

What is claimed is:
1. A map update system, comprising:
  a navigation apparatus that provides guidance from a current position to a destination having been set based upon map data stored therein and downloads various types of information that are requested by a user; and a providing apparatus that provides the various types of information to be downloaded at the navigation apparatus, wherein:

the providing apparatus transmits the various types of information and update information related to an update of the map data to the navigation apparatus in response to a download request transmitted from the navigation apparatus;

the navigation apparatus issues a notice related to the update of the map data based upon the update information transmitted from the providing apparatus, while downloading the various types of information;

the navigation apparatus makes a decision as to whether or not to issue the notice based upon contents of the information to be downloaded and issues the notice only if a decision to issue the notice is made.

2. A map update system according to claim 1, wherein:
the navigation apparatus issues a notice containing information related to a pre-update map version and a post-update map version with regard to an update of map data for a specific update target area to a latest map data version, while downloading the various types of information.

3. A map update system according to claim 1, wherein:
the navigation apparatus issues a notice containing details of map changes to result from an update of map data for a specific update target area to a latest map data version, while downloading the various types of information.

4. A map update system according to claim 3, wherein:
in response to a request from the user, the navigation apparatus transmits to the providing apparatus information related to a map version of map data currently stored therein together with the download request for the various types of information;

the providing apparatus, at which text data related to details of map changes are set in advance and stored in correspondence to individual areas, extracts text data corresponding to a relevant area from the stored text data based upon the information related to the map version transmitted from the navigation apparatus and transmits the extracted text data to the navigation apparatus as the update information; and the navigation apparatus issues the notice containing the details of map changes for the user based upon the text data transmitted from the providing apparatus.

5. A map update system according to claim 1, wherein:
the navigation apparatus indicates a position of a specific update target area while downloading the various types of information.

6. A map update system according to claim 5, wherein:
when indicating the position of the update target area on a map, the navigation apparatus switches a map scaling factor so as to include the update target area within a range of map display.

7. A map update system according to claim 5, wherein:
the providing apparatus transmits information related to a latest map version to the navigation apparatus as the update information; and the navigation apparatus selects as the update target area an area with a disparity between information related to a map version of map data currently stored therein and the information related to the latest map version transmitted from the providing apparatus.

8. A map update system according to claim 2, wherein:
the navigation apparatus also issues a notice indicating a length of communication time required to update map data in the update target area to the latest map data version, while downloading the various types of information.

9. A map update system according to claim 8, wherein:
the navigation apparatus is wirelessly connected with the providing apparatus via a communication terminal connected to the navigation apparatus;

the providing apparatus transmits information indicating a data size of update map data to be used to update map data to the latest map data version as the update information; and the navigation apparatus determines the length of communication time based upon the data size and a communication line speed achieved at the communication terminal through wireless connection.

10. A map update system according to claim 1, wherein:
the navigation apparatus issues a notice indicating a position of a service store offering a service for updating map data, while downloading the various types of information.

11. A map update system according to claim 10, wherein:
when indicating the position of the service store on a map, the navigation apparatus switches a map scaling factor so as to include the service store within a range of map display.

12. A map update system according to claim 1, wherein:
the navigation apparatus clears the notice once download of the various types of information is completed.

13. A map update system according to claim 1, wherein:
if a notice with identical contents related to an update of map data has already been issued over a predetermined time period, the navigation apparatus does not issue the notice.

14. A map update system, comprising:
a navigation apparatus that provides guidance from a current position to a destination having been set based upon map data stored therein and downloads various types of information that are requested by a user; and a providing apparatus that provides the various types of information to be downloaded at the navigation apparatus, wherein:

the providing apparatus transmits the various types of information and update information related to an update of the map data to the navigation apparatus in response to a download request transmitted from the navigation apparatus;

the navigation apparatus issues a notice related to the update of the map data based upon the update information transmitted from the providing apparatus, while downloading the various types of information, the providing apparatus makes a decision as to whether or not to allow the navigation apparatus to issue the notice based upon contents of the information to be downloaded to the navigation apparatus; and the navigation apparatus issues the notice only if the providing apparatus makes a decision to allow the navigation apparatus to issue the notice.

15. A map update system according to claim 1, wherein:
the various types of information include at least one of traffic information, current news, weather forecasts and tourist guide information.

16. A map update system according to claim 1, wherein:
the navigation apparatus issues the notice related to the map data update at least either through a display or an audio output.

17. An apparatus comprising:
a navigation apparatus that provides guidance from a current position to a destination having been set based upon map data stored therein and downloads various types of information that are requested by a user, wherein:
the navigation apparatus receives update information related to an update of the map data while downloading the various types of information;
the navigation apparatus issues a notice related to the update of the map data based upon the update information while downloading the various types of information; and
the navigation apparatus makes a decision as to whether or not to issue the notice based upon contents of the information to be downloaded and issues the notice only if a decision to issue the notice is made.

18. An apparatus comprising:
a providing apparatus that transmits various types of information to a navigation apparatus in response to a request from a user, wherein:
the providing apparatus transmits the various types of information and update information related to an update of map data stored in the navigation apparatus in response to a download request received by the providing apparatus from the navigation apparatus;
the providing apparatus causes the navigation apparatus to issue a notice related to the update of the map data based upon the update information transmitted from the providing apparatus, while downloading the various types of information;
the providing apparatus makes a decision as to whether or not to cause the navigation apparatus to issue the notice based upon contents of the information to be downloaded to the navigation apparatus, and causes the navigation apparatus to issue the notice only if a decision to issue the notice is made.

* * * * *